INVENTORS.
Lee E. Elfes &
Leo J. Lorenz
BY Carlson, Pitzner, Hubbard & Wolfe
Attorneys INVENTORS.
Lee E. Elfes &
Leo J. Lorenz
BY Carlson, Pitzner, Hubbard & Wolfe
Attorneys

# United States Patent Office 2,932,932
Patented Apr. 19, 1960

2,932,932

DRIVING MEANS FOR A TRACTOR MOUNTED RECIPROCATING MOWER

Lee E. Elfes, Birmingham, and Leo J. Lorenz, Detroit, Mich., assignors to Massey-Ferguson Inc., a corporation of Maryland Original application August 5, 1954, Serial No. 447,984, now Patent No. 2,853,843, dated September 30, 1958. Divided and this application December 11, 1957, Serial No. 702,107

2 Claims. (Cl. 56—25)

The invention relates to tractor-operated mowers and more particularly mowers of the type adapted to be mounted on the body of a general purpose tractor and integrated with it so that the tractor and mower operate as a unitary machine.

This application is a division of our co-pending application Serial No. 447,984, filed August 5, 1954, now Patent No. 2,853,843.

One object of the invention is to provide improved means for driving a side-mounted mower from the rear power take-off of a tractor, which mechanism is compact and sturdy and completely free of universal joints.

It is also an object of the invention to provide a rugged and durable side-mounted mower equipped with an efficient and reliable driving mechanism which can be produced economically, which is easy to attach to a tractor, and which is efficient and reliable in operation.

Other objects and advantages of the invention will become apparent from the following detailed description of the preferred embodiment illustrated in the accompanying drawings, in which Figure 1 is a plan view of a mower embodying the features of the invention, the mower being shown as mounted on a tractor.

Figure 1:
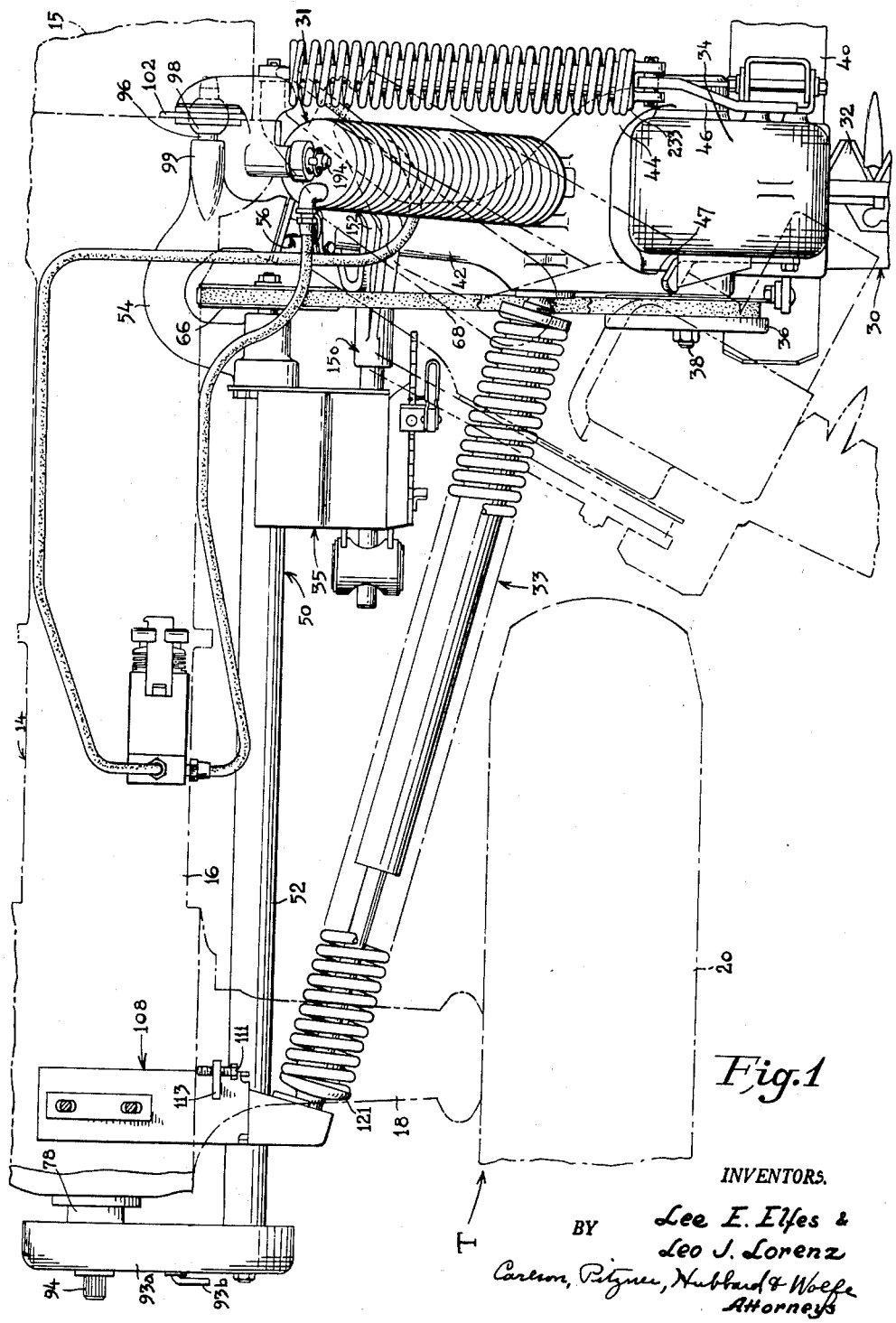

While the invention is susceptible of various modifications and alternative constructions, there is shown in the drawings and will be described in detail the preferred embodiment and an earlier form thereof, but it is to be understood that it is not thereby intended to limit the invention to the forms illustrated but it is intended to cover all modifications and alternative constructions falling within the spirit and scope of the invention as expressed in the appended claims.

By way of orientation in the art, the mower herein disclosed may, in general, be considered as an improvement on the side-mounted mower illustrated and described in an instruction manual entitled "Heavy Duty Mower P-EO-A 21—Operating and Assembly Instructions," published in 1949, by Harry Ferguson, Inc., of Detroit, Michigan. It is designed for mounting on a tractor T having means for supplying fluid under pressure for operating the cutter bar positioning means of the mower. When mounted on a tractor equipped with a hydraulically operated implement hitch, such as the "Ferguson" tractor, pressure fluid may be taken from the tractor hydraulic system.

In the particular tractor illustrated provision is made for connection with the hydraulic system by interchanging a suitable fitting with a cover plate provided on the tractor center housing.

As an aid to understanding the problems involved in mounting a mower on and integrating it with a tractor, it will be well to consider briefly the general construction of the tractor. Referring to Fig. 1 of the drawings, the exemplary tractor has an elongated body 14 comprising an engine 15 and a center housing 16 assembled with the engine forward and joined as a rigid unitary structure by bolts inserted through mating flanges on the respective parts. Extending from opposite sides of the center housing adjacent its rear ends are axle housings 18 (Fig. 1) supporting the tractor's rear drive wheels 20. The wheels are driven from the tractor engine in a well-known manner through a selective change-speed transmission.

Tractors of the type shown are equipped with a rear power take-off shaft 22 (Fig. 2) adapted to be driven from the tractor engine. The lower take-off shaft projects rearwardly of the center housing and through a pad formed thereon which has suitable threaded holes for attachment of a cover or for the mounting of certain accessories with which the present invention is not concerned. When the mower is mounted on the tractor, the above-mentioned cover is removed for attachment of the mower drive mechanism to be described later.

The improved mower is adapted to be mounted directly on the body of the tractor, that is, independently of the implement hitch linkage. The linkage is thus left free for attachment of other implements to the tractor which can be operated in the usual manner without requiring removal of the mower or alternatively can be retained on the tractor while the mower is operated alone. As an example, a side delivery rake or the like may be coupled to the tractor hitch linkage so that the operator can switch from mowing to raking or vice versa, as desired. It will be understood, of course, that the mower and the rake or other implement attached to the hitch linkage can be operated simultaneously if desired.

As in conventional mowers, the main operating element of the improved mower is an elongated cutter bar 30. The cutter bar is supported for pivoting movement about a fore-and-aft axis at the outer end of a drag bar 42 which, at its inner end, is supported for universal swinging and swiveling movements on a frame structure 50 mounted on the tractor. Power actuating means 31, in this instance hydraulically operated, is provided for swinging the cutter bar and the drag bar between their operating and inactive positions. Breakback mechanism 33 normally holds the cutter bar in laterally projecting relation to the tractor, as shown in full lines in Fig. 1, but permits it to swing rearwardly to the position shown in broken lines in case the cutter bar strikes an obstruction. Mechanism 35 is provided for rocking the drag bar and attached cutter bar about an axis transverse to the tractor to adjust the fore-and-aft tilt of the latter.

To obtain its broad objective of simplifying attachment and detachment, the major components of the mower referred to generally above, together with mechanism for driving the cutter bar from the power take-off shaft, are constructed and assembled to form a unitary structure adapted to be mounted on and dismounted from the tractor as a unit. In other words, the various elements of the mower are assembled and more or less permanently interconnected before they are mounted on the tractor and the assembly remains intact after removal of the tractor. This materially reduces the labor involved and shortens the time required for mounting and dismounting, and, in addition, insures proper interconnection and adjustment of the mower parts. Furthermore, handling and storage of the mower is simplified and loss or misplacement of parts is avoided.

Figure 2:
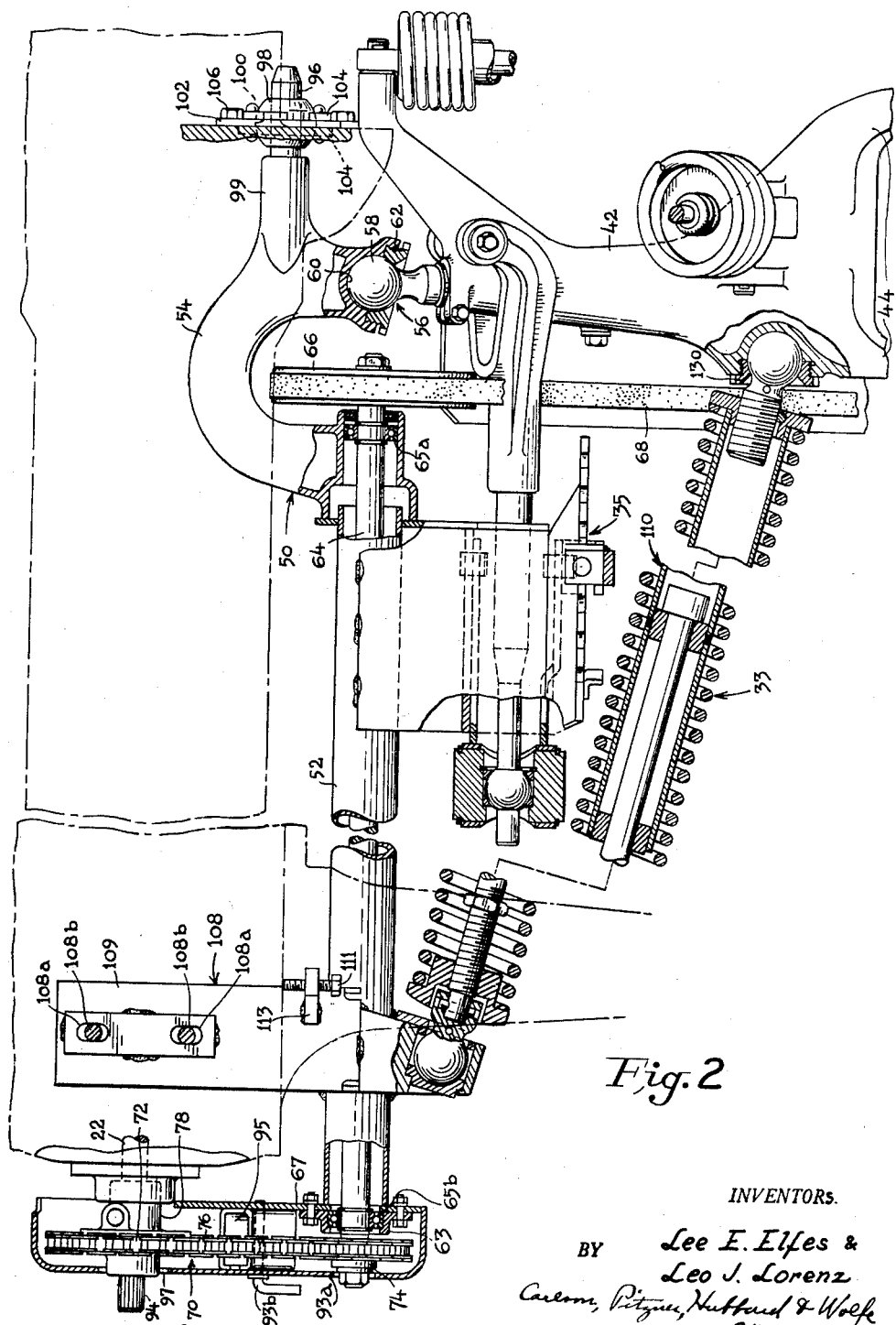
Fig. 2 is a plan view of the device shown in Fig. 1 with parts omitted and other parts broken away and shown in section.

Turning now to a more detailed description of the exemplary mower and referring to Figs. 1 and 2 of the drawings, the cutter bar 30 may be of any preferred form, including the usual toothed knife 32 reciprocated by a driving head 34 to which the inner end of the bar is attached. The drivehead 34 likewise may be of any preferred character and as shown is adapted to receive power by way of a pulley 36 fixed on the projecting end of a shaft 38 journaled in the head. The head also carries a ground shoe 40 adapted to ride along the surface of the ground when the mower is in operation. It will be understood, of course, that the cutter bar may also be provided at its outer end with a conventional ground shoe which with the shoe 40 serves to hold the cutter bar clear of the ground.

As shown in Fig. 1, the cutter bar 30 is supported on the drag bar 42 through the medium of the drivehead 34. For this purpose the outer end of the drag bar is bifurcated to form a yoke 44 adapted to straddle the head and the latter is pivotally supported on the legs of the yoke as by front and rear trunnions 46 and 47. The shaft 38 is located coaxially of the trunnions so that the cutter bar and drivehead may be swung about their pivots on the drag bar without interfering with the drive.

The frame structure 50 constitutes the backbone of the mower and ties the elements together into a unitary structure, and, in addition, serves to support the major elements of the mower on the tractor. In its preferred form, the frame structure 50 comprises an elongated tubular rear member 52 rigidly joined to the rear leg of a U-shaped front member 54 disposed so as to open laterally of the rear member. Preferably, the drag bar 42 is mounted on the forward leg of the member 54 by a suitable joint 56 permitting universal swinging and swiveling of the bar. The joint 56, as shown, is a ball and socket joint comprising a ball element 58 (Fig. 2) fixed on or rigidly secured to the inner end of the drag bar and seated in an outwardly facing spherical socket 60 formed in the member 54. A retaining nut 62 threaded into the mouth of the socket retains the ball element therein.

The frame structure 50, as indicated above, supports the mechanism for driving the cutter bar from the tractor power take-off shaft which is characterized by its compactness and simplicity. Thus, the drive mechanism includes a shaft 64 extending axially through the tubular frame member 52 and journaled in front and rear bearings 65a and 65b (Fig. 2). The bearing 65a as shown is seated in a recess in the front frame member 54 disposed so as to aline the shaft 64 axially with the axis of the ball joint 56. Bearing 65b is carried in a retainer 63 bolted or otherwise secured to a heavy plate 67 fixed to the rear end of the frame member 52.

The shaft 64 projects into the space between the legs of the frame member 54 and on its projecting end carries a pulley 66 drivingly connected with the pulley 36 of the drivehead by a V-belt 68. It will be observed that the U-shaped form of the frame member 54 provides clearance for the pulley 66 and permits the shaft 64 to be coaxially alined with the axis of the ball and socket joint 56. Thus, as the drag bar and cutter bar are swung vertically about the joint 56, the distance between the pulleys 36 and 66 remains constant so that the tension of the belt is not affected nor the drive interfered with in any way.

It is to be particularly noted that the improved drive mechanism is free of universal joints which are expensive to manufacture and difficult to maintain. Furthermore, it imposes no restraint on the drag bar 42 so that the latter may swing rearwardly with the cutter bar as a unit when the latter strikes an obstruction. The long lever arm thus provided insures a quick and effective breakback action when the cutter bar strikes an obstruction anywhere along its length, and particularly when the obstruction is met by the inner end of the bar.

Figure 3:
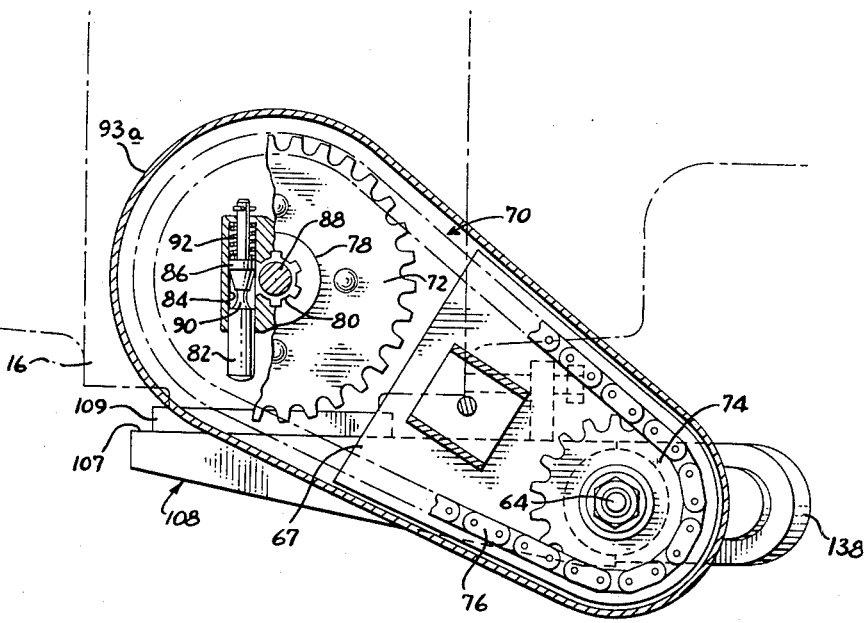
Fig. 3 is a rear elevational view of the mechanism coupling the mower to the tractor power take-off shaft, the cover normally enclosing the mechanism being removed and other parts shown in section.

Connection between the drive shaft 64 and the power take-off shaft 22 of the tractor is effected through the medium of a chain-type drive 70 (Figs. 2 and 3). As herein shown, the drive comprises a sprocket 72 on the power take-off shaft and a sprocket 74 on the shaft 64. A roller chain 76 drivingly connects the sprockets. Preferably the sprocket 72 is drivingly coupled to the power take-off shaft 22 by a quick detachable coupling, such as the spring detent shown in Fig. 3. Thus, the sprocket has a hub 78 formed with a splined bore 80 adapted to receive the shaft. A locking plunger 82 slidable in a transverse bore 84 in the hub 78 has a locking enlargement 86 adapted to interlock with a peripheral notch or groove 88, conventionally provided in power take-off shafts. A spring 92 biases the plunger to locking position but permits manual shifting of the plunger so as to bring a reduced portion 90 thereof into registration with the groove so that the sprocket can be slipped off the shaft. As a safety precaution, the drive 76 is covered by a removable guard 93a. As shown in Fig. 2, the guard is clamped by a screw 93b to a spacing member 85 welded or otherwise secured to the rear face of the plate 67.

To provide for driving a rear mounted implement from the tractor power take-off shaft while the mower drive is in place, the sprocket 72 is provided with a rearwardly projecting stub shaft 94 suitably splined for accommodation of standardized drive fittings. This hub, as shown in Fig. 2, is arranged to project through a suitable opening 97 in the guard 93a so that the connection may be made without removal of the guard.

The unitary assembly of the mower elements with the frame 50 contributes substantially to the ease of mounting and dismounting the mower and those operations are further simplified and facilitated by the novel mode of attachment of the frame to the tractor. More particularly, provision is made for attaching the frame to the tractor at two points spaced apart fore and aft of the tractor, the attaching means comprising simple, easily applied attaching elements. Thus at the front end of the frame there is provided a connecting element in the form of a pin 96 adapted for engagement with a cooperating apertured element 98 permanently mounted on the body of the tractor. In the particular form of the frame illustrated, the pin 96 is suitably anchored in a boss 99 integral with and projecting forwardly from the frame member 54.

The apertured connecting element 98 is preferably in the form of a ball and is supported for free turning movement in a socket 100 formed in an apertured mounting bracket 102 and a pair of retaining plates 104 secured at opposite sides of the bracket. The bracket 102 may be conveniently secured to the tractor as by bolts 106 which are normally provided for joining the abutting flanges of the engine and the housing 16. The bracket projects only a short distance laterally of the tractor body and interferes in no way with the normal operation of the tractor. Accordingly, it may be left in place when the mower is dismounted so that remounting is further facilitated.

For attaching the rear portion of the frame 50 to the tractor, a laterally projecting bracket 108 is welded or otherwise secured to the frame member 52 adjacent its rear end. The bracket which may comprise a metal stamping is channel shaped in cross-section and is disposed in inverted position so as to present its upper face as a flat, horizontal bearing surface adapted to fit flush against a pad provided on the tractor center housing for mounting a swinging draw bar. Slots 108a in the bracket are spaced apart to receive the bolts 108b ordinarily supplied for attachment of the draw bar. The slots are elongated in a direction to permit lateral swinging of the frame about the axis of the ball 98 as a pivot after attachment of the bracket 108 to the tractor. Thus, the frame may be swung inwardly of the tractor to permit easy placement of the chain 76 over the sprockets 72 and 74 after which the frame can be swung outwardly to tension the chain. The bolts 108b, of course, are tightened when the frame is properly positioned and they, together with an adjusting screw 111, securely hold the frame in such position. As shown in Fig. 2, the adjusting screw is threaded through a lug 113 welded to the upper face of the bracket 108 and its inner end is disposed for engagement with an adjacent portion of the tractor center housing.

The breakback mechanism 33, which constitutes the subject matter of a companion application, normally holds the cutter bar in correct operating position while permitting it to swing rearwardly when an obstruction is encountered. As shown, it comprises a spring loaded compression member 110 connected between the drag bar 42 and the frame structure 50. If the cutter bar encounters an obstruction which is sufficiently unyieldable to overcome the force of the loading spring, the cutter bar and drag bar swing rearwardly on breakback about the ball and socket joint 56 as a pivot. Such rearward movement is limited to substantially the position in which the parts are shown in broken lines in Fig. 1, as determined by the position of the stop means provided in the compression member to prevent the cutter bar from hitting the adjacent rear wheel of the tractor.

It may also be noted that with the construction and arrangement shown, reciprocation of the cutter bar is automatically interrupted upon the occurrence of a breakback. Such interruption is effected automatically by the slacking off of the drive belt 68 which takes place by reason of the fact that the pivotal axis of the drag bar at the ball and socket joint 56 is offset forwardly from the drive pulley 66 on the shaft 64. Thus, the swinging of the drag bar in a horizontal plane is effective to interrupt the drive for the cutter bar while the driving connection is retained during vertical swinging of the drag bar.

It will be evident from the foregoing that a mower constructed in accordance with the invention presents substantial advantages over previous side-mounted mowers. The simple, sturdy frame structure 50 supports all of the major components of the mower, including the cutter carrying drag bar 42, the breakback mechanism 33, the tilt mechanism 35 and the drive mechanism for transmitting power from the tractor power take-off shaft to the cutter bar drivehead. Moreover, those components are all assembled with the frame in a unitary structure adapted for mounting on and removal from the tractor as a unit. Since the mower parts are connected together at all times, the mower is easy to handle when dismounted and there is little likelihood of any parts becoming lost or misplaced.

Mounting of the mower is extremely simple since only two connections are required between the tractor and the frame structure and both are located for convenient accessibility. Thus, with the mower laid out on the ground, the tractor is run alongside and the front end of the frame is raised to insert the pin 96 in the apertured ball 98. No heavy lifting is involved since the cutter bar 30 and the drivehead 34 remain on the ground while the pin is being inserted.

After establishment of the front connection, the rear end portion of the frame structure is raised either manually or with the aid of the tractor lift mechanism, as previously described, and the bracket 108 is secured in place by the bolts 108b provided for the purpose. Before the bolts are tightened, the frame is shifted inwardly of the tractor and the drive chain 76 is placed over the sprockets 72 and 74. Sprocket 72, of course, is mounted on the power take-off shaft as previously described and locked in place by the spring detent. When the drive chain is in place, the frame is shifted outwardly to properly tension it and is secured in fixed position by tightening the bolts 108b and screwing in the adjusting screw 111.

The final step in the mounting consists in attaching the actuator 183 to the bracket 198. To make this connection, the drivehead and cutter bar are raised sufficiently to allow the ball 191 to be inserted over the stud 207. The cutter bar is preferably rocked to the upper or raised position to minimize overhanging weight, which in any case is not particularly great since the frame structure itself is already supported by the tractor and only the drivehead, cutter bar and actuating means is lifted. It will be seen therefore that the complete installation may be effected quickly and with relatively little effort.

Important advantages are realized from the novel construction and relationship of parts in addition to the ease of mounting and dismounting the mower. Thus, the drive mechanism is materially simpler in construction than drive mechanisms heretofore required for side-mounted mowers. In particular, it is to be noted that no universal joints are required which reduces manufacturing costs and simplifies maintenance. Furthermore, the location of the main drive shaft within the frame structure makes it possible to utilize the pivoted mounting of the drag bar for breakback, or in other words, to allow the drag bar and cutter bar to break back as a unit when the latter strikes an obstruction. This is particularly advantageous in providing more leverage when the obstruction is met by the inner end of the cutter bar.

We claim as our invention:

1. In a mower attachment adapted to be mounted on the side of a tractor or the like, having a rearwardly projecting power take-off shaft, the combination comprising a supporting member having a tubular rear portion and a generally U-shaped forward portion, coupling elements detachably mounting the supporting member at one side of the tractor in a generally fore-and-aft position with the U-shaped portion of the member facing laterally, a drive shaft journaled in the tubular portion of the supporting member and extending axially therethrough, a sprocket and chain mechanism drivingly connecting the power take-off shaft and the rear end of said drive shaft, a drive pulley mounted on the forward end of the drive shaft within said U-shaped portion of the member, a laterally extending cutter bar, means including a drag bar pivotally connecting the cutter bar to the U-shaped portion of the supporting member forwardly of said pulley for vertical swinging movement about a point alined with the forward end of the drive shaft, said U-shaped portion of the supporting member affording clearance for said drive pulley, a second pulley on the cutter bar for operating the latter, and a belt connecting the drive pulley to the second pulley.

2. In a mower assembly for use with a tractor having a rearwardly projecting power take-off shaft, the combination of a frame structure including an elongated member with a U-shaped member rigidly secured adjacent its forward end, cooperating supporting elements at the outer ends of said members and on the tractor supporting the frame structure at one side of the tractor in a fore-and-aft position, the supporting elements at the forward end of the structure permitting the member to pivot thereon and the supporting elements at the rear end of the structure permitting lateral movements of the structure, a drive shaft journaled in and extending through said tubular member, a chain and sprocket mechanism drivingly connecting said shaft with the power take-off shaft, and means acting between one of the supporting elements and the tractor body for shifting the rear end of said structure in a direction to maintain the chain of the driving connection under tension.

References Cited in the file of this patent

UNITED STATES PATENTS

| | | |
|---|---|---|
| 1,855,838 | Kranick | Apr. 26, 1932 |
| 2,628,467 | Gillespie | Feb. 17, 1953 |
| 2,700,861 | Goss | Feb. 1, 1955 |
| 2,726,502 | Hall | Dec. 13, 1955 |
| 2,853,843 | Elfes et al. | Sept. 30, 1958 |

FOREIGN PATENTS

| | | |
|---|---|---|
| 513,659 | Belgium | Sept. 15, 1952 |